(12) United States Patent
Lo (10) Patent No.: US 8,419,581 B2
(45) Date of Patent: Apr. 16, 2013

(54) HUB MOTOR FOR ELECTRIC VEHICLES

(76) Inventor: Chiu-Hsiang Lo, Taishung County (TW)

( * ) Notice: Subject to any disclaimer, the term of this patent is extended or adjusted under 35 U.S.C. 154(b) by 281 days.

(21) Appl. No.: 12/896,142

(22) Filed: Oct. 1, 2010

(65) Prior Publication Data
US 2012/0083375 A1    Apr. 5, 2012

(51) Int. Cl.
*F16H 48/06* (2006.01)
*F16H 48/30* (2006.01)
*B60K 1/00* (2006.01)

(52) U.S. Cl.
USPC ................ 475/153; 475/149; 475/5; 477/7; 180/65.51; 180/65.6; 180/65.8

(58) Field of Classification Search .............. 475/149
See application file for complete search history.

(56) References Cited

U.S. PATENT DOCUMENTS

| | | | |
|---|---|---|---|
| 5,242,335 A * | 9/1993 | Kutter | 475/4 |
| 5,771,988 A * | 6/1998 | Kikutani et al. | 180/65.51 |
| 2007/0187952 A1 * | 8/2007 | Perlo et al. | 290/1 R |
| 2012/0080934 A1 * | 4/2012 | Lo | 301/6.5 |
| 2012/0150377 A1 * | 6/2012 | Buchheim et al. | 701/22 |

FOREIGN PATENT DOCUMENTS

JP    2005-335536    * 12/2005

* cited by examiner

*Primary Examiner* — David D Le
*Assistant Examiner* — Colby M Hansen (57) ABSTRACT

A hub motor for electric vehicles and includes a rim, connecting members, a motor housing, a gear ring, a coil unit, a shaft, a tube, a magnet unit, a sun gear, a planet gear frame and multiple planet gears. The gear ring and the coil unit are fixed in the motor housing and two bearings are located between the shaft and the motor housing so that the motor housing is rotatable relative to the shaft. The tube has the magnet unit and the sun gear, and the planet gear frame is fixed to the shaft and the planet gears are connected to the planet gear frame. The planet gears are engaged with the gear ring and the sun gear.

2 Claims, 9 Drawing Sheets

HUB MOTOR FOR ELECTRIC VEHICLES

FIELD OF THE INVENTION

The present invention relates to a hub motor for electric vehicles, and more particularly, to a hub motor wherein the coil unit and the magnet unit are rotated relative to each other about the shaft so as to obtain a simple structured and high efficiency hub motor.

BACKGROUND OF THE INVENTION

There are different types of driving mechanisms for electric vehicles and the hub motors are developed to improve the shortcomings of the conventional driving mechanism which require long transmission system and are not suitable for electric wheeled chairs. The conventional hub motors are disclosed in U.S. Pat. Nos. 3,897,843, 4,346,777, 4,913,258, 7,719,412 and 6,974,399, and applicant owned U.S. Pat. No. 6,974,399. All of the disclosures relate to the use of electric motor directly driving the wheels.

Most of the conventional hub motors involve complicated structure so as to have required output work, and the complicated structure includes large number of parts which are costly and take a lot of time for assembly, and maintenance cost is significant.

The conventional hub motors includes coil unit and magnetic unit connected to the rim, and the battery is connected to the frame of the vehicle. In other words, the battery and the hub motor are separately connected to the frame and the wheel. In order to provide power to the hub motor from the battery, the coil unit is fixed to the shaft of the wheel and a hole is drilled from the periphery of the shaft so that the hole extends axially along the shaft. The wires are electrically connected between the coil unit and the battery via the hole. The battery is usually bulky and heavy so that the battery has to be connected to the strong portion of the frame such as the seat tube or the carriage rack. Therefore, the wires have to extend a long distance along the frame and this obviously cannot achieve the aesthetic purpose and requires a significant time to position the wires. In addition, the hole in the shaft may weaken the structure of the shaft.

Some wheels are equipped with power generating members which operate only when the wheels rotate and are not designed for directly providing electric power to the rotation of the wheels. In other words, when the wheels are stationary or the vehicles brake, the kinetic energy is transferred into electric power is stored in the battery attached to the vehicle frame.

The conventional hub motors are complicated and do not have battery directly connected to the rim.

The present invention intends to provide a hub motor to improve the shortcomings of the conventional hub motors.

SUMMARY OF THE INVENTION

The first object of the present invention is to provide a hub motor for electric vehicles and the hub motor includes a rim, connecting members, a motor housing, a gear ring, a coil unit, a shaft, a tube, a magnet unit, a sun gear, a planet gear frame and multiple planet gears. The gear ring and the coil unit are fixed in the motor housing and two bearings are located between the shaft and the motor housing so that the motor housing is rotatable relative to the shaft. The tube has the magnet unit and the sun gear, and the planet gear frame is fixed to the shaft and the planet gears are connected to the planet gear frame. The planet gears are engaged with the gear ring and the sun gear. By this arrangement, the hub motor is simplified and easily assembled to the electric vehicles.

The second object of the present invention is to provide a hub motor wherein the motor housing has a closed portion at a first end thereof and an opening is defined in a second end of the motor housing. A separation board is located in the motor housing. Two bearings are mounted to the closed portion and mounted to the shaft and the tube. A cap is mounted to the opening. Each of the cap and the separation board has two respective bearings connected thereto. The shaft includes a first rod and a second rod which is connected to the first rod. The first rod extends through the tube and the planet gear frame is mounted to the second rod. The bearing connected to the cap is mounted to the shaft.

The third object of the present invention is to provide a hub motor which has its own power supply and has an integral body so as to easily assemble to different electric vehicles. The wires of the hub motor do not need to extend along the whole frame of the vehicles. The connecting members of the rim fix the motor housing, the battery and the control device. The battery provides electric power to the hub motor and the control device receives a wireless command signal and generates a control signal to control the battery to provide power to the hub motor.

The fourth object of the present invention is to provide a hub motor wherein the rim has multiple connecting members which are arranged to a star-shaped arrangement and each connecting member is a board-like member and a recess is defined in a surface of the connecting member. A box is engaged with the recess and the battery is located in the recess. A star-shaped cover is connected to the connecting members to seal the recesses to position the motor housing.

The fifth object of the present invention is to provide a hub motor which has sufficient power supply and includes multiple batteries and boxes, each box is fixed to the connecting member and extends in radial direction of the rim. Each box has multiple batteries received therein so that the batteries are arranged in radial direction of the rim.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 9:
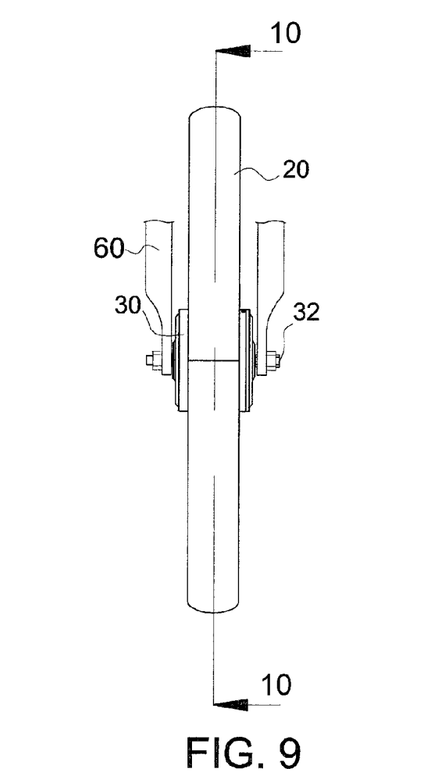
FIG. 9 is a front view of the assembled rim and the hub motor of the present invention.
Figure 10:
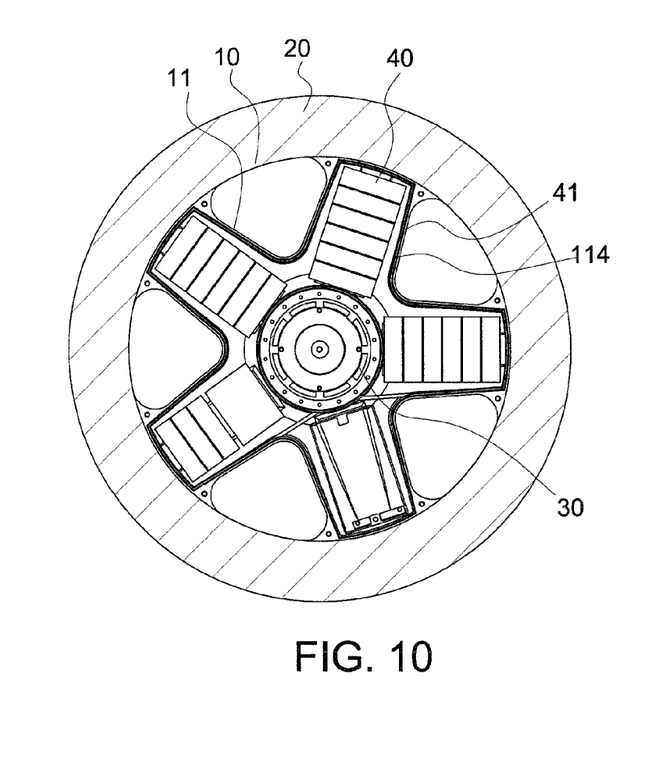
FIG. 10 is a cross-sectional view taken along line 10-10 of FIG. 9.
Figure 11:
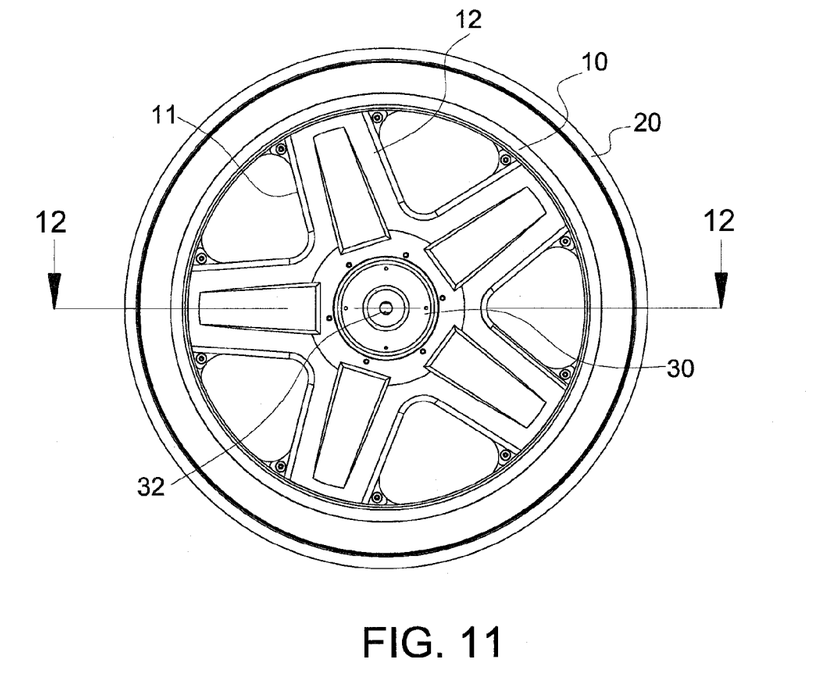
FIG. 11 is a side view of the assembled rim and the hub motor of the present invention.
Figure 12:
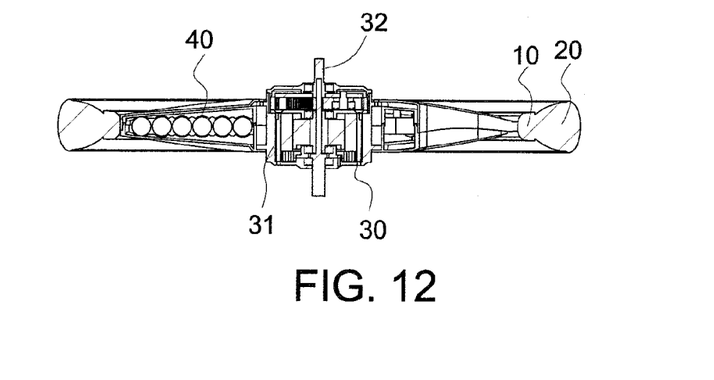
FIG. 12 is a cross-sectional view taken along line 12-12 of FIG. 11.

To achieve the first purpose of the present invention, referring to FIGS. 1-6, the hub motor 30 of the present invention is to be installed on a rim 10, the rim 10 has a tire 20 connected to an outer periphery thereof and at least one connecting member 11 is connected to an inside of the rim 10. The hub motor 30 of the present invention comprises a cylindrical motor housing 31 which is fixed to the at least one connecting member 11 and located at the center of the rim 10; a gear ring 35 and a coil unit 33 are fixed to an inside of the motor housing 31; a shaft 32 extends through the motor housing 31 and located on the central axis of the motor housing 31 and the center of the rim 10, and two ends of the shaft 32 are fixed to a vehicle frame 60 (referring to FIG. 9); a first bearing 313 and a second bearing 371 are located between the motor housing 31 and the shaft 32 so that the motor housing 31 is rotatable about the shaft 32.

The shaft 32 extends through a tube 341 and a third bearing 314 and a fourth bearing 380 are located between the tube 341 and the motor housing 31. The motor housing 31 is rotatable relative to the tube 341 which is rotatable relative to the shaft 32.

A magnet unit 34 is fixed to the tube 341 and located corresponding to the coil unit 33, so that the coil unit 33 is located around the magnet unit 34 and does not contact the magnet unit 34.

A sun gear 342 is co-axially connected to the tube 341. A planet gear frame 36 is fixed to the shaft 32 and has multiple pivots 360 which are located at even central angles along a periphery of the planet gear frame 36. Each pivot 360 has a planet gear 362 mounted thereto and the planet gears 362 are engaged with the gear ring 35 and the sun gear 342.

Figure 3:
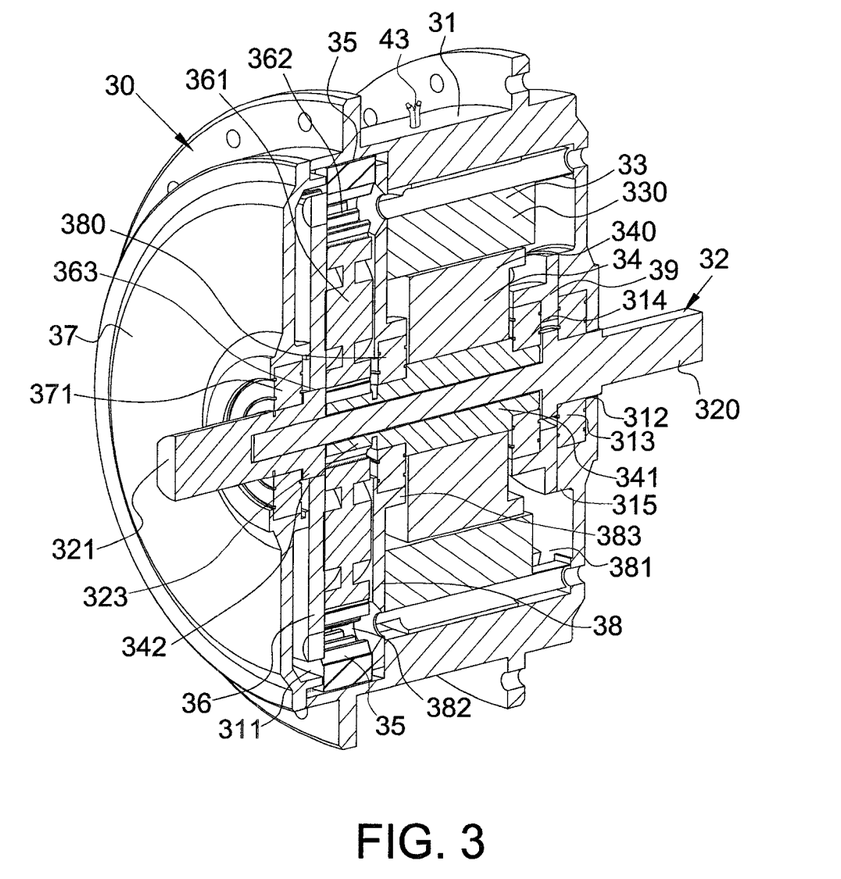
FIG. 3 is a partial cross sectional view of the hub motor of the present invention.
Figure 4:
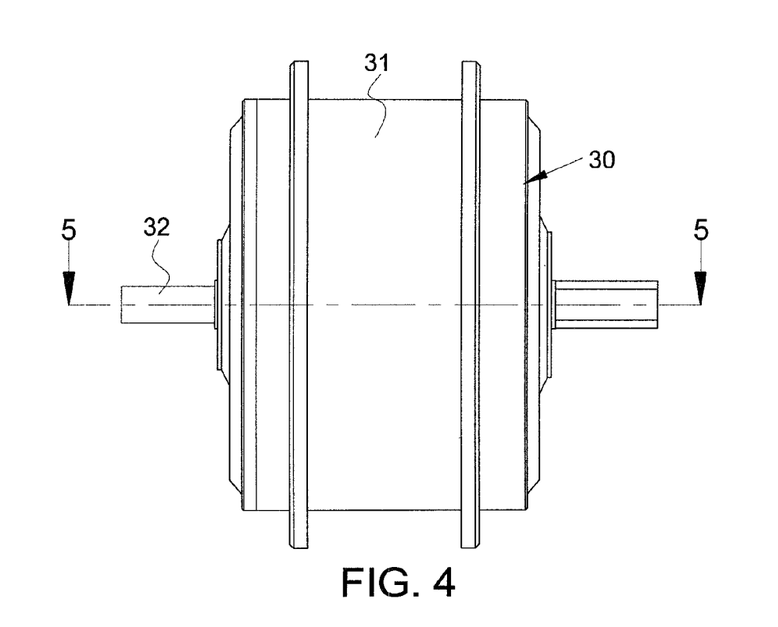
FIG. 4 is a front view of the hub motor of the present invention.
Figure 5:
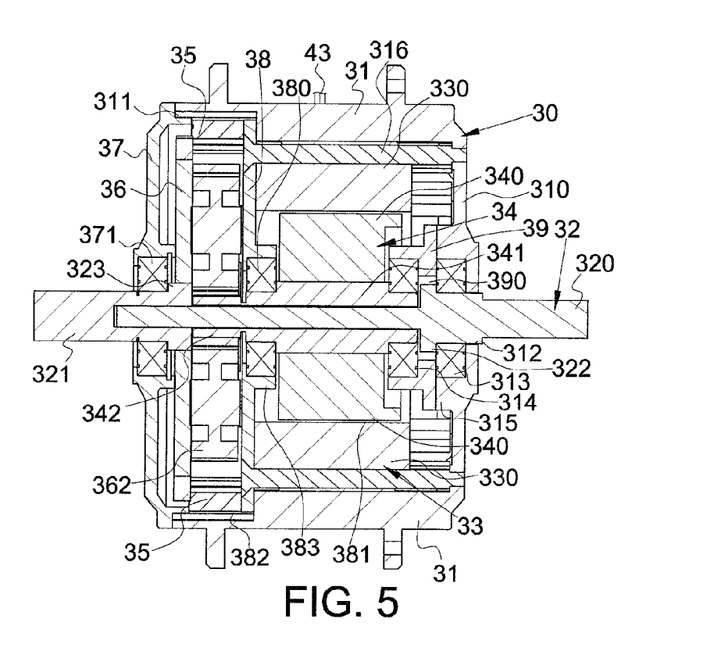
FIG. 5 is a cross-sectional view taken along line 5-5 of FIG. 4.

As shown in FIGS. 3 and 5, the magnet unit 34 is fixed to the mediate portion of the tube 341 and the sun gear 342 is connected to one end of the tube 341. The gear ring 35 is fixed to the inside of the motor housing 31. The planet gear frame 36 is a disk like frame and three pivots 360 are connected to the planet gear frame 36 at even central angle. Each pivot 360 has a bearing 361 mounted thereto and one planet gear 362 is mounted to the bearing 361 so that the planet gear 362 is rotatable relative to the pivot 360. The planet gears 361 are located around the sun gear 342 and inside of the gear ring 35. The planet gears 362 are engaged with the sun gear 342 and the gear ring 35.

To achieve the second purpose of the present invention, referring to FIGS. 1-6, the hub motor 30 of the present invention comprises a rim 10, multiple connecting members 11, a motor housing 31, a gear ring 35, a coil unit 33, a shaft 32, a tube 341, a magnet unit 34, a sun gear 342, a planet gear frame 36 and multiple planet gears 362. The motor housing 31 has a closed portion 310 at a first end thereof and an opening 311 is defined in a second end of the motor housing 31. A passage 312 is defined centrally through the closed portion 310 and a third bearing 314 is connected to the closed portion 310 and located adjacent to the first bearing 313, so that the first and third bearings 313, 314 are co-axially fixed to the closed portion 310, and located corresponding to the passage 312. The first bearing 313 is mounted to the shaft 32 and the third bearing 314 is mounted to the tube 341 and the shaft 32. A cap 37 is mounted to the opening 311 and the second bearing 371 is connected to the cap 37. The second bearing 371 is mounted to the shaft 32. A separation board 38 is located in the motor housing 31 and an annular flange 383 connected to the separation board 38 so as to accommodate the fourth bearing 380. The tube 341 extends through the fourth bearing 380 and the shaft 32 extending through the tube 341. The separation board 38 and the closed portion 310 define a first chamber 381 therebetween, and the separation board 38 and the cap 37 define a second chamber 382 therebetween. The sun gear 342, the planet gear frame 36, the planet gears 362 and the gear ring 35 are received in the second chamber 382. The tube 341, the coil unit 33 and the magnet unit 34 are received in the first chamber 381. The shaft 32 includes a first rod 320 and a second rod 321 which is connected to the first rod 320. The first rod 320 extends through the tube 341 and the planet gear frame 36 and the second bearing 371 are mounted to the second rod 321. Bolts 316 extend through the separation board 38 and closed portion 310, and the bolts 316 position the coil unit 33.

Figure 1:
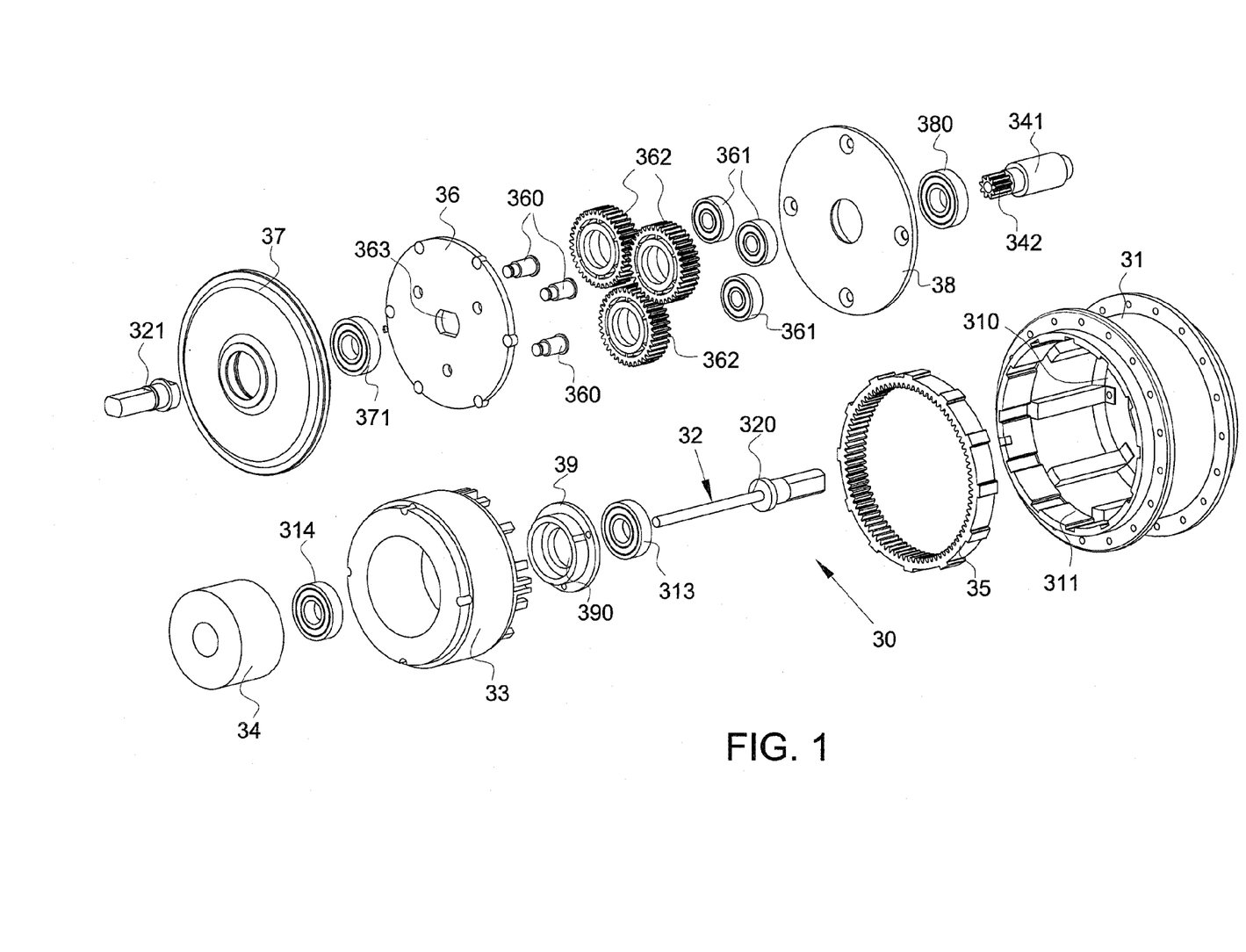
FIG. 1 is an exploded view to show the hub motor of the present invention.
Figure 2:
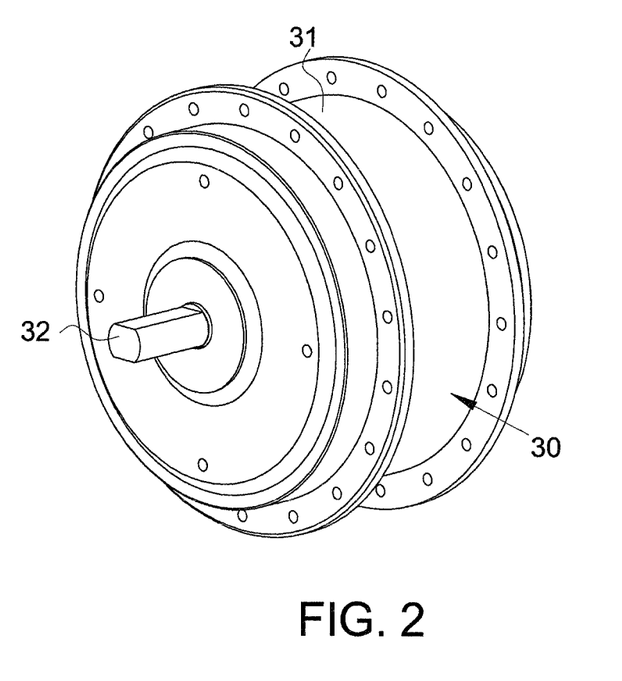
FIG. 2 is a perspective view to show the hub motor of the present invention.

As shown in FIGS. 1, 3 and 5, the closed portion 310 has a bearing cage 39 so that the third bearing 314 is connected to the bearing cage 39. The passage 312 of the closed portion 310 has a flange 315 in which the first bearing 313 is located. The bearing cage 39 is connected to the flange 315 so that the third bearing 314 in the bearing cage 39 is co-axially located with the first bearing 313. The bearing cage 39 has a hole 390 defined centrally therethrough and the shaft 32 extends through the hole 390. The shaft 32 includes the first rod 320 and the second rod 321. The first rod 320 has a first lip 322 and the second rod 321 has a second lip 323. The first rod 320 extends axially through the tube 341 and the first bearing 313 is mounted to the first rod 320 and positioned by the first lip 322. The planet gear frame 36 has an elongate hole 363 and the second rod 321 extends through the elongate hole 363 so that the planet gear frame 36 is fixed to the second rod 321. The second bearing 371 is mounted to the second rod 321 and positioned by the second lip 323.

To achieve the third purpose of the present invention, referring to FIGS. 1, 5 and 6~12, the hub motor 30 of the present invention comprises a rim 10, at least one connecting member 11, a motor housing 30, a gear ring 35, a coil unit 33, a shaft 32, a tube 341, a magnet unit 34, a sun gear 342, a planet gear frame 36 and multiple planet gears 362. The connecting member 11 includes a first end 110 and a second end 111 which extends in opposite direction from that of the first end 110. The first end 110 is connected to the inside of the rim 10 and the second end 111 extends toward the center of the rim 10. The at least one connecting member 11 has at least one battery 40 and a control device 50 connected thereto. The control device 50 receives a wireless command signal and generates a control signal to control the battery 40 to provide power to the hub motor.

Figure 6:
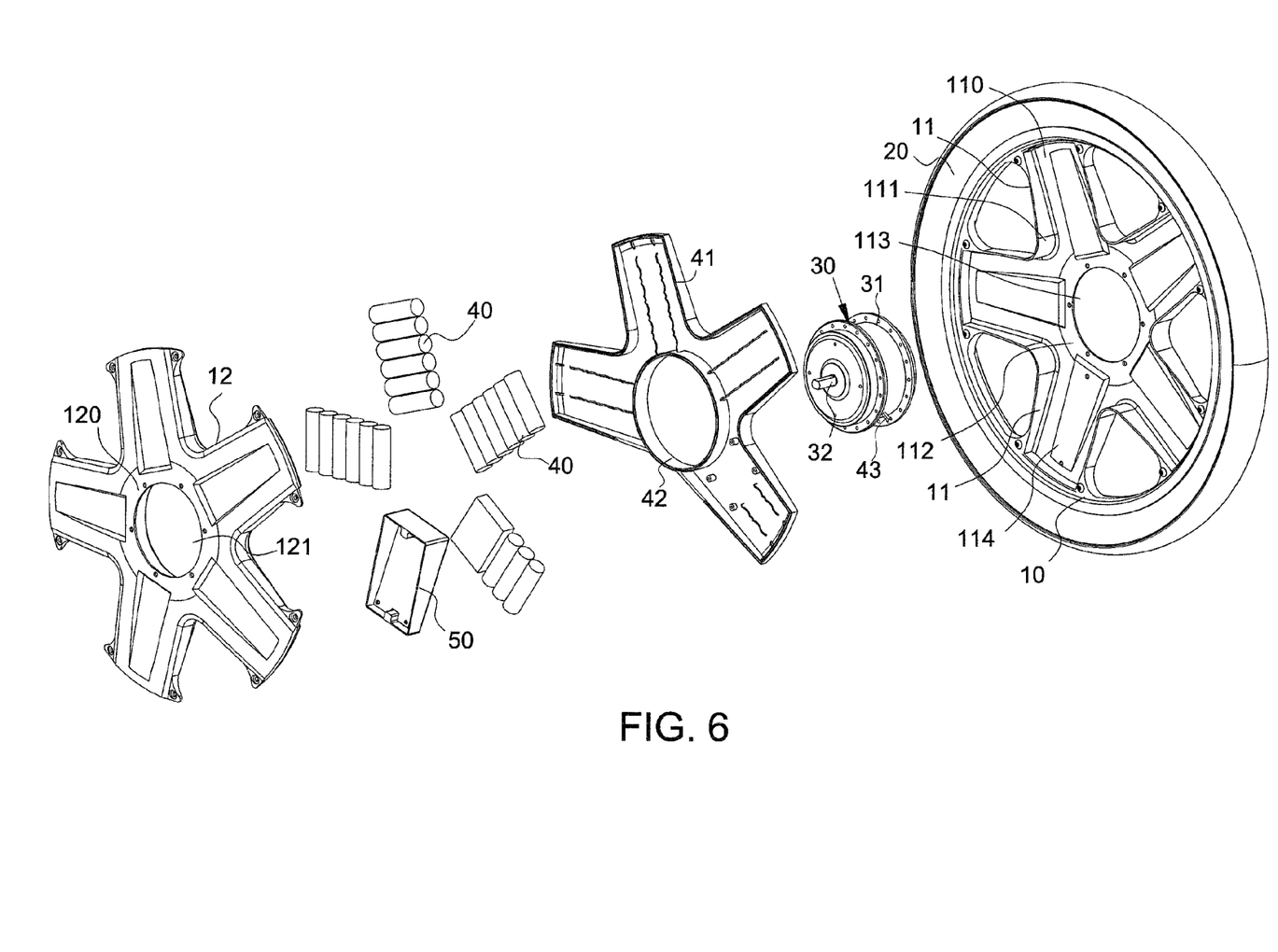
FIG. 6 is an exploded view to show the rim and the hub motor of the present invention.
Figure 7:
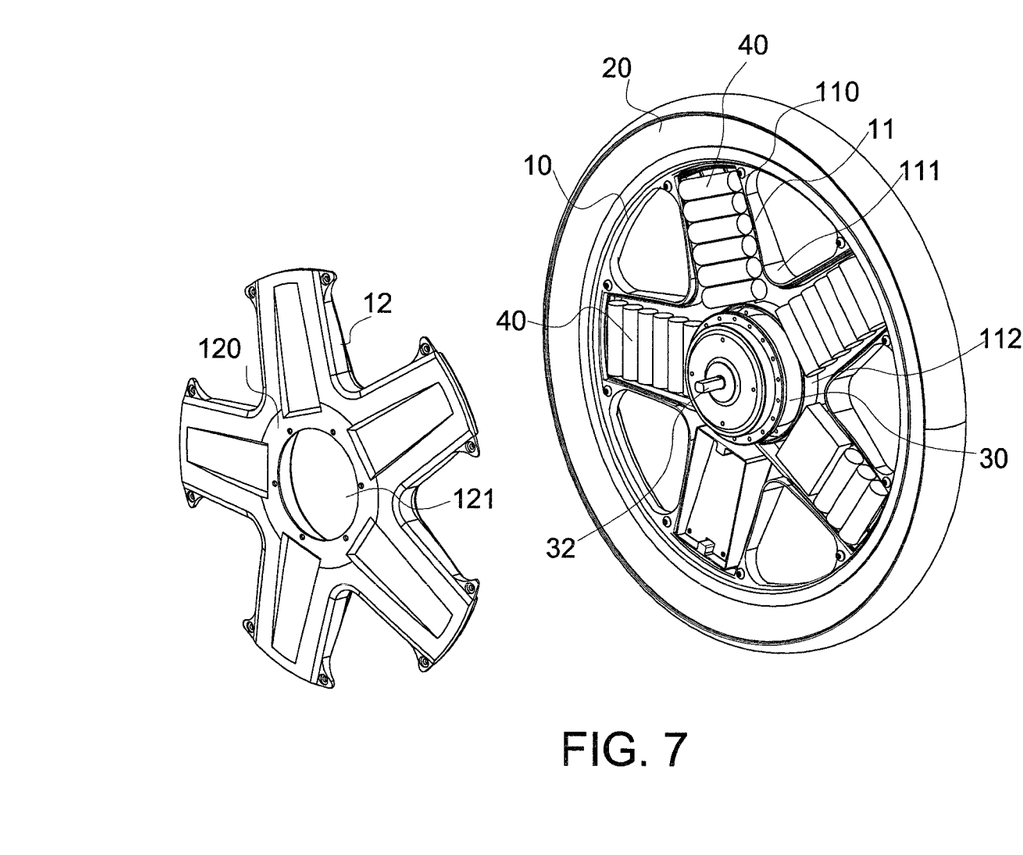
FIG. 7 shows the assembled rim and the cover of the hub motor of the present invention.
Figure 8:
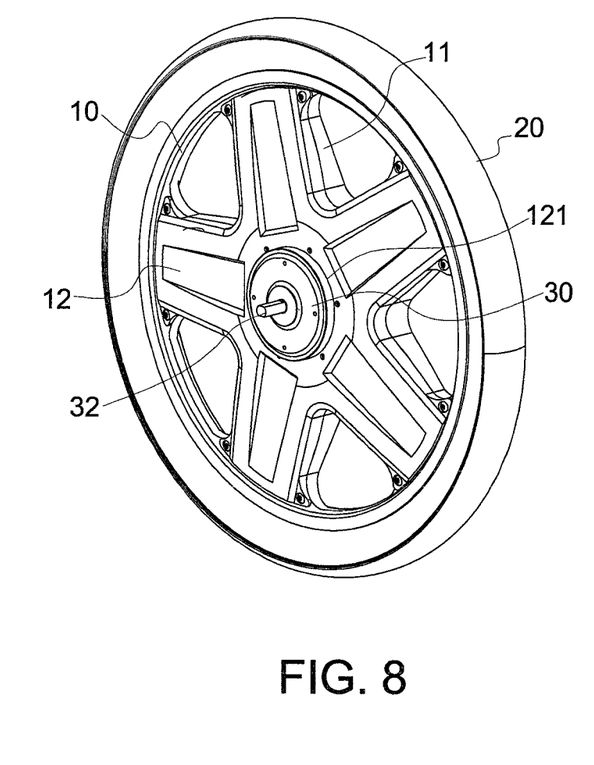
FIG. 8 is a perspective view to show the assembled rim and the hub motor of the present invention.

As shown in FIGS. 3, 5 and 6, the coil unit 33 is fixed to the motor housing 31 which is integrally connected to the rim 10, and the at least one battery 40 is connected to the rim 10. The at least one battery 40 and the coil unit 33 are rotated with the rotation of the rim 10, so that wires 43 can be directly connected between the at least one battery 40 and the coil unit 33. The rim 10 has the hub motor 30 and the at least one battery 40.

As shown in FIGS. 3, 5 and 6, the at least one battery 40 and the coil unit 33 are connected to each other by the wires 43 which do not pass through the inside of the shaft 32 and extend out. The wires 43 directly extend through the motor housing 31 and one end of each wire 43 is located outside of the motor housing 31 and electrically connected to the at least one battery 40, the other end of each wire 43 is located within the motor housing 31 and electrically connected with the coil unit 33. Therefore, the shaft 32 does not need to be drilled and the structural strength is reinforced.

To achieve the fourth purpose of the present invention, referring to FIGS. 1, 5, and 6~12, the hub motor 30 of the present invention comprises a rim 10, at least one connecting member 11, a motor housing 31, a gear ring 35, a coil unit 33, a shaft 32, a tube 341, a magnet unit 34, a sun gear 342, a planet gear frame 36 and multiple planet gears 362. There are multiple connecting members 11 located in the rim 11 and each connecting member 11 is a board-like member. A recess 114 is defined in a surface of the connecting member 11 and a box 41 is engaged with the recess 114. At least one battery 40 is located in the recess 114. The respective second ends of the multiple connecting members 11 are connected to each other to form a first fixing portion 112 which is in a star-shaped portion. The motor housing 31 is fixed to the first fixing portion 112 and has a first hole 113 at a center thereof. The shaft 32 extends through the first hole 113. The rim 10 has a star-shaped cover 12 connected thereto which are connected to the connecting members 11 so as to close the recesses 114 and to position the boxes 41 with the batteries 40 in the recesses 114. A second fixing portion 120 is located at a center of the cover 12 and the motor housing 31 is fixed to the second fixing portion 120. A second hole 121 is defined through the second fixing portion 120 and the shaft 32 extends through the second hole 121.

To achieve the fifth purpose of the present invention, referring to FIGS. 1, 5, and 6~12, the hub motor 30 of the present invention comprises a rim 10, at least one connecting member 11, a motor housing 30, a gear ring 35, a coil unit 33, a shaft 32, a tube 341, a magnet unit 34, a sun gear 342, a planet gear frame 36 and multiple planet gears 362. The box is a star-shaped box and a circular hole 42 is defined in a center thereof and the motor housing 31 extends through the circular hole 42. The box 41 accommodates multiple batteries 40 which are located in radial direction of the rim 10.

There are several advantages of the present invention and which are:

1. The present invention has a simple structure including the rim 10, the batteries 40 and the hub motor 30, so that the present invention can easily connected to the electric vehicles.

2. The motor housing 31 of the hub motor 30 includes the closed portion 310 and the opening 311. The opening 311 is covered by the cap 37 and the separation board 38 is located in the motor housing 31 so as to accommodate the sun gear 342, planet gear frame 36, the planet gears 362, the gear ring 35, the rotor and the stator. The shaft 32 is composed of the first rod 320 and the second rod 321, both of which are pivotably connected to the components mentioned above. The assembly is easy and systematical.

3. The wheel of the electric vehicle is equipped with the power supply to obtain a complete and integral structure, and can be easily installed to the electric vehicles. There will be no messy wires and control cables located on the vehicle frame.

4. The batteries 40 are fixed to the connecting members 11 of the rim 10 and located around the hub motor 30. The wires 43 of the batteries 40 and the coil unit 33 do not pass through the shaft 32 and directly extend through the motor housing 31. Therefore the shaft 32 does not need to be drilled and the structural strength is reinforced.

5. The present invention has multiple batteries 40 and boxes 41, and the boxes 41 are star-shaped boxes whose extensions can be fixed to the connecting members 11 and located in radial direction of the rim 10. Each star-shaped box 41 has multiple batteries 40 which are located in the radial direction to provide sufficient electric power to the hub motor.

6. Each connecting member 11 is a board-like connecting member and has a recess 114 for receiving the box 41 in which the batteries 40 are received. The star-shaped cover 12 is used to cover all of the recesses 114 and position the motor housing 31 to simplify the steps of assembling.

While we have shown and described the embodiment in accordance with the present invention, it should be clear to those skilled in the art that further embodiments may be made without departing from the scope of the present invention.

What is claimed is:

1. A hub motor comprising:
a rim (10) having a tire (20) connected to an outer periphery thereof and at least one connecting member (11) connected to an inside of the rim (10), the at least one connecting member (11) extending toward a center of the rim (10);
a motor housing (31) fixed to the at least one connecting member (11) and located at the center of the rim (10);
a gear ring (35) fixed to an inside of the motor housing (31);
a shaft (32) extending through the motor housing (31) and located on the central axis of the motor housing (31) and the center of the rim (10), a first bearing (313) and a second bearing (371) located between the motor housing (31) and the shaft (32) so that the motor housing (31) is rotatable about the shaft (32);
the shaft (32) extending through a tube (341) and a third bearing (314) and a fourth bearing (380) located between the tube (341) and the motor housing (31), the motor housing (31) being rotatable relative to the tube (341) which is rotatable relative to the shaft (32);
a magnet unit (34) fixed to the tube (341) and located corresponding to the coil unit (33);
a sun gear (342) co-axially connected to the tube (341), and
a planet gear frame (36) fixed to the shaft (32) and having multiple pivots (360) which are located at even central angles along a periphery of the planet gear frame (36), each pivot (360) having a planet gear (362) mounted thereto and the planet gears (362) engaged with the gear ring (35) and the sun gear (342);
wherein the motor housing (31) having a closed portion (310) at a first end thereof and an opening (311) being defined in a second end of the motor housing (31); the closed portion (310) having a flange (315) extending from a periphery thereof and a bearing frame (39) being fixed to the flange (315); the first bearing (313) is located within the flange (315) and the third bearing (314) being connected to the bearing frame (39), and the first and third bearings (313, 314) being co-axially positioned; a cap (37) being mounted to the opening (311), the second bearing (371) being connected to the cap (37), the first and second bearings (313, 371) being mounted to the shaft (32); a separation board (38) being located in the motor housing (31), the third bearing (314) being connected to the closed portion (310) and located close to the first bearing (313), the fourth bearing (380) being connected to the separation board (38), the third and fourth bearings (314, 380) being mounted to the tube (341) and the shaft (32) extending through the tube (341); two ends of the shaft (32) adapted to be fixed to a vehicle frame (60), the shaft (32) including a first rod (320) and a second rod (321) which is connected to the first rod (320), the first rod (320) extending through the tube (341) and the first bearing (313) being mounted to the first rod (320), the planet gear frame (36) being mounted to the second rod (321), the second bearing (371) being mounted to the second rod (321).

2. The hub motor as claimed in claim 1, wherein a first chamber (381) and a second chamber (382) are respectively defined by the separation board (38), the closed portion (310) and the cap (37), the sun gear (342), the planet gear frame (36), the planet gears (362) and the gear ring (35) are received in the second chamber (382), the tube (341), the coil unit (33) and the magnet unit (34) are received in the first chamber (381).

* * * * *